(12) United States Patent
Klappert et al.

(10) Patent No.: US 8,725,125 B2
(45) Date of Patent: May 13, 2014

(54) SYSTEMS AND METHODS FOR CONTROLLING AUDIO PLAYBACK ON PORTABLE DEVICES WITH VEHICLE EQUIPMENT

(71) Applicant: United Video Properties, Inc., Santa Clara, CA (US)

(72) Inventors: Walter R. Klappert, Los Angeles, CA (US); Satinderpal S. Sikh, Studio City, CA (US); Michael R. Nichols, La Canada Flintridge, CA (US); Richard Bullwinkle, Palo Alto, CA (US)

(73) Assignee: United Video Properties, Inc., Santa Clara, CA (US)

( * ) Notice: Subject to any disclaimer, the term of this patent is extended or adjusted under 35 U.S.C. 154(b) by 43 days.

(21) Appl. No.: 13/630,755

(22) Filed: Sep. 28, 2012

(65) Prior Publication Data

US 2014/0094151 A1 Apr. 3, 2014

(51) Int. Cl.
*H04M 3/42* (2006.01)

(52) U.S. Cl.
USPC .......... 455/414.1; 455/245.1; 455/1; 342/463

(58) Field of Classification Search
USPC ........ 455/245.1, 1, 410, 456.1; 340/540, 441, 340/425.5; 342/357.25, 463
See application file for complete search history.

(56) References Cited

U.S. PATENT DOCUMENTS

| 7,474,264 B2 * | 1/2009 | Bolduc et al. ................. 342/463 |
| 2005/0064835 A1 * | 3/2005 | Gusler et al. ............... 455/245.1 |
| 2008/0268768 A1 * | 10/2008 | Brown et al. ..................... 455/1 |

* cited by examiner

*Primary Examiner* — Kiet Doan
(74) *Attorney, Agent, or Firm* — Ropes & Gray LLP

(57) ABSTRACT

Systems and methods are provided for playing media assets in a vehicle. A signal indicating the existence of a voice call is detected in a vehicle. It is determined whether a portable device inside the vehicle is outputting audio to a first audio device. If a portable device is outputting audio to a first audio device, the audio level of the output audio component is compared with an audio level threshold to determine whether the output of the audio component to the first audio device interferes with audio output of the call. If the output audio component is determined to interfere with the audio output of the call, the audio component output through the first audio device is repressed. If the output audio component is determined to not interfere with the audio output of the call, the audio component is output through the first audio device without interruption.

24 Claims, 6 Drawing Sheets

| 900 | |
|---|---|
| Apple iPod Touch | 38 |
| Sony Portable Blu-Ray Disc Player BDP-SX1000 | 35 |
| Sony PlayStation Portable 3000 | 42 |
| Apple iPhone 4S | 40 |
| Apple iPad 2 | 25 |
| Google Nexus 7 | 28 |
| Lenovo IdeaTab S2109 | 36 |
| Samsung Galaxy Note 10.1 | 30 |
| TomTom VIA 1505TM 5-Inch GPS | 50 |
| Dell Inspiron i17RN-2944BK 17" Laptop | 45 |
| 910 | 920 |

FIG. 9

SYSTEMS AND METHODS FOR CONTROLLING AUDIO PLAYBACK ON PORTABLE DEVICES WITH VEHICLE EQUIPMENT

BACKGROUND

Traditional on-board vehicle equipment allows a user to receive and initiate telephone calls using a vehicle's on board equipment. The telephone user, often the driver, uses such an on-board telephone in hands-free speaker mode. With the proliferation of portable media devices in modern day society, it is common for passengers to use their portable devices in the vehicle. Audio output from such portable devices interferes with the telephone call and makes it very difficult to conduct the telephone call in hands-free speaker mode. When a call is initiated or received, the telephone participant must request each participant to pause or mute the audio playback of their portable media devices. Thus, traditional systems fail to provide the user with an efficient and seamless way to prevent the audio output from all portable devices within the vehicle from interfering with a telephone call that is in progress.

SUMMARY

In view of the foregoing, methods and systems for playing media assets in a vehicle are provided. The systems and methods described below include techniques for playing media assets on a portable media device inside the vehicle connected to a primary audio device or a secondary audio device.

In several embodiments of the present invention, a signal indicating a voice call is detected on a vehicle equipment. The signal may be received over a wireless network from the vehicle equipment. Upon detecting the signal indicating the existence of a voice call, it is determined whether a portable device inside the vehicle is playing a media asset that includes an audio component being output through a primary audio device. Audio level of the audio component output through the primary audio device may be compared with an audio level threshold stored in a database to determine whether the output of the audio component through the primary audio device will interfere with audio output of the voice call through the vehicle equipment. Upon determining that the audio component output through the primary audio device will interfere with the audio output of the voice call, the audio component output through the primary audio device is repressed. However, if the audio component output through the primary audio device is determined to not interfere with the audio output of the voice call, output of the audio component through the primary audio device may be maintained without interruption.

In some embodiments, the signal indicating the existence of a voice call may be detected when a voice call is initiated using the vehicle equipment. In other embodiments, the signal may be detected when a received voice call has been answered using the vehicle equipment.

In some embodiments, the primary audio device may be a speaker.

In some embodiments, playback of the media asset may be paused upon determining that the audio component output through the primary audio device will interfere with the audio output of the voice call. In other embodiments, the audio component of the media asset outputted through the primary audio device may be muted upon determining that the audio component output through the primary audio device will interfere with the audio output of the voice call.

In some embodiments, a determination may be made that the audio component no longer interferes with the audio of the voice call. Once such a determination has been made, the playback of the paused media asset may be resumed.

In some embodiments, the audio level of the output audio component may be measured, the audio level threshold stored in a database may be indentified, and it may be determined whether the audio level of the output exceeds the audio level threshold.

In some embodiments, it may be determined whether the output of the audio component of the media asset through a secondary audio device associated with the portable device will interfere with the audio output of the voice call. Once a secondary audio device is detected to have been activated and it is determined that the output of the audio component of the media asset through the secondary audio device will not interfere with the audio output of the voice call, the audio component of the media asset may be output through the secondary audio device instead of being output through the primary audio device.

In some embodiments, detecting that a secondary audio device has been activated may include checking whether a headphone, an earphone, a microphone, or an in-ear monitor is connected to a portable media device.

In other embodiments, detecting that a secondary audio device has been activated may include checking whether an option to output the audio component of the media asset through the secondary audio device has been selected.

In some embodiments, several portable devices playing media assets that output audio to their respective primary audio devices may be detected. If the audio components of media assets output through the primary audio devices from at least two of the portable devices are determined to interfere with the audio output of the voice call, the audio components of these portable devices may simultaneously repressed.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 shows an illustrative table listing audio level thresholds for various portable media devices in accordance with various embodiments of the invention.

DETAILED DESCRIPTION OF EMBODIMENTS

Figure 1:
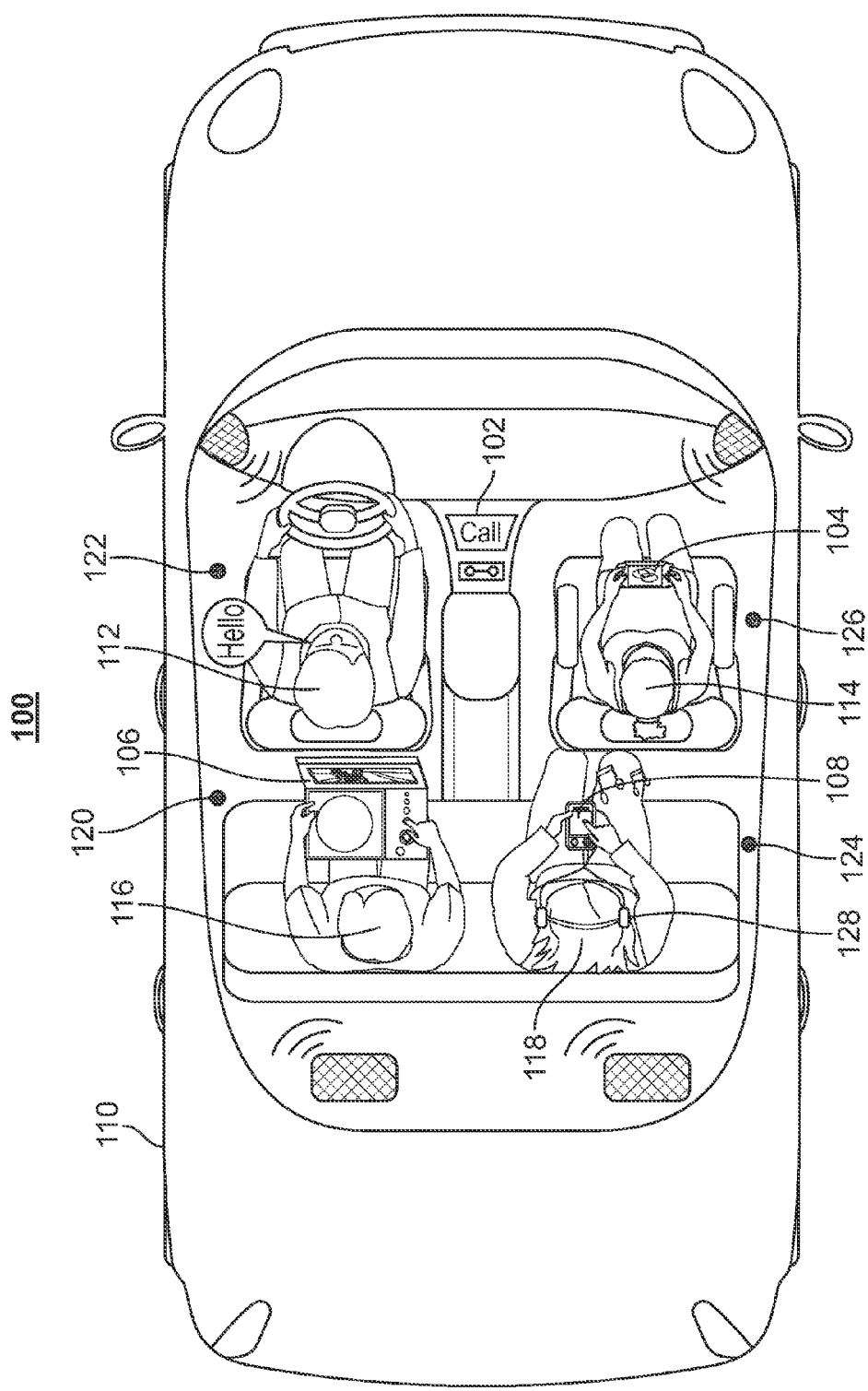
FIG. 1 shows a top view of an automobile that includes a number of portable devices and vehicle systems, including on-board vehicle control equipment in accordance with various embodiments of the invention.

Portable media players outputting audio can be disruptive when a user is engaged in a voice call. Consequently, users engaged in a voice call using on-board vehicle equipment desire a form of automatic control that can prevent such portable media players from outputting audio when they are engaged in a voice call. A system that provides such automatic control over the portable media devices in a vehicle is referred to herein as an on-board vehicle media control system or a vehicle media control system.

Several passengers may be playing media assets on their portable media devices when the vehicle equipment engages in a voice call. As soon as the on-board vehicle media control system detects that the vehicle equipment is engaged in a voice call, the vehicle media control system checks to see whether any of the portable devices are outputting audio that is above a certain audio level threshold. If the vehicle media control system detects that the audio level of the output audio exceeds the threshold, then the vehicle media control system represses audio output from these portable media devices.

Once the vehicle media control system detects that headphones have been connected to a particular portable media device and that the output audio level from these headphones does not exceed the audio level threshold, the vehicle media control system resumes audio playback of the media asset for that portable media device through the headphones.

The amount of content available to users on such portable media devices can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," "portable device", "portable media device" or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, automobile stereos, automobile compact disc player, automobile MP3 player, automobile satellite radio, GPS device, on board media consumption device, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIG. 1 shows an illustrative environment for the vehicle media control system. In the embodiment illustrated in FIG.

1, the environment for the vehicle media control system may be an automobile. Automobile 110 may include several portable devices such as devices 104, 106, and 108. Automobile 110 may also include a voice call equipment 102 on its dashboard. Voice call equipment may be a telephone, a mobile phone, a smartphone, a satellite phone, a voice over internet protocol (VOIP) phone, a videophone, a computer with an Internet connection, or any other processing circuitry capable of receiving and initiating voice calls. Voice call equipment 102 may also be a docking interface to connect a user's mobile telephone to automobile 110's on-board vehicle equipment.

Several users, such as users 112, 114, 116, and 118, may be playing media assets on their portable media devices inside automobile 110. In the example shown in FIG. 1, user 114 is playing a video game on a portable gaming device 104. User 116 is playing a movie on his portable DVD player 106. User 118 is playing a song on his portable music storage device 108. Each of these portable media devices may output audio of the media asset a user is playing using a primary audio device. Each of these portable media devices may also contain a headphone jack to connect to a secondary audio device. As referred to herein, a primary audio device is a device that outputs audio at audio levels that may interfere with the audio of a voice call. Primary audio devices may be integrated into the hardware of the portable media devices such as built-in speakers on a portable music player or portable DVD player. In addition, primary audio device may be external audio devices such as a boombox, loudspeaker, amplifier, stereos, surround sound system, audio docking equipment such as an iPod speaker, computer speakers, and digital speakers. A secondary audio device is an audio device that does not interfere with the audio of the voice call conducted over the speaker of another device such as the automobile voice call equipment. Secondary audio devices may be external audio devices for private audio listening such as headphones, earphones, microphones, and in-ear monitors.

In some cases, the primary audio device can become a secondary audio device. For instance, a laptop speaker may be outputting audio at an audio level that may initially interfere with the audio of the voice call on voice call equipment 102. However, once the audio level output through that laptop speaker has been lowered such that it does not exceed a threshold set for that laptop speaker, the audio output from the laptop speaker no longer interferes with the audio of the voice call conducted on voice call equipment 102. Accordingly, the laptop speaker, which was initially a primary audio device, becomes a secondary audio device once the audio level of its output audio is lowered. Similarly, a secondary audio device can become a primary audio device. For instance, headphones outputting the audio of an iPod Touch may be outputting audio at an audio level that does not initially interfere with the audio of the voice call on voice call equipment 102. However, if the audio level of the iPod Touch is increased such that the audio level of the audio output through the headphones interferes with the audio of the voice call conducted on voice call equipment 102, the headphones become a primary audio device.

The on-board vehicle equipment can detect any of these portable media devices if the portable media devices are capable of connecting to a wireless network. The vehicle media control system may control playback on each of these portable media devices through such a wireless network. The vehicle media control system may be capable of controlling audio playback of the media asset being played on these portable media devices. In addition, the vehicle media control system may be capable of controlling playback or execution of the video or software associated with the audio output from these portable media devices. Such control allows the vehicle media control system to be able to quiet devices whose audio output interferes with a voice call being answered using the vehicle's voice call equipment 102.

When a call is received on voice call equipment 102 and user 112 answers the call, the vehicle media control system may prevent the playback of media assets or lower the audio level of the media asset on any portable media device connected to the wireless network that it determines is outputting an audio component louder than an audio level threshold for any portable media device listed in database 900. Similarly, when user 112 or any other user in vehicle 110 initiates a voice call using voice call equipment 102, the vehicle media control system may be able to prevent the playback of media assets or lower the audio level of the media asset on any portable media device connected to the wireless network that it determines is outputting an audio component louder than any audio level threshold listed in database 900. In this manner, the vehicle media control system may be able to control the audio output of the portable media devices so that the audio output of the portable media devices does not interfere with the voice call at voice call equipment 102.

Automobile 110 may include sensors placed throughout the vehicle to detect the audio levels output from portable media devices at various locations in the vehicle, such as sensors 120, 122, 124, and 126. These sensors may be able to wirelessly connect and communicate with the vehicle equipment to communicate audio level data at various locations of the vehicle to the vehicle media control system. In an embodiment, when vehicle media control system detects that the audio input at any of these sensors is greater than a preset audio level threshold, vehicle media control system may instruct the devices nearest the sensor to repress their audio output. In another embodiment, the vehicle control system may instruct all portable devices to repress their output if any of the sensors detect that the audio level at any portion of automobile 110 exceeds the preset audio threshold.

In another embodiment, the portable media device may be able to determine whether the audio component output from an audio device connected to it exceeds a predetermined threshold. The portable media device may detect the audio level output from the audio device itself using a microphone. Once the microphone of the portable media device detects the audio level of the audio component output from a first audio device connected to it, the portable media device may determine whether its output audio level exceeds that of a preset audio level threshold. The portable media device may obtain the preset audio level threshold listed in database 900 for that portable media device. The portable media device may acquire the audio level threshold information from database 900 stored in storage 418 of vehicle equipment 420 over a wireless network. Once the portable media device identifies its threshold audio level, the portable media device may compare the identified audio level information output from its audio device. If the portable media device determines that its audio level does not exceed the threshold audio level, then the portable media device takes no action and simply continues monitoring the audio level output from its connected audio device. However, if the portable media device determines that its audio level exceeds the preset threshold, then portable media device may transmit an indication to control circuitry 404 that its output audio component exceeds the predetermined threshold. Once control circuitry 404 receives such an indication, control circuitry 404 may instruct the portable media device to reduce its audio level to an audio level under the threshold or pause playback of the audio component of the media asset. In another implementation, once a portable media device determines that the audio component output from its audio device exceeds a predetermined threshold, portable media device may reduce its audio level to an audio level under the threshold or pause playback of the audio component of the media asset.

The vehicle media control system may also be configured to detect whether any of portable media devices 104, 106, and 108 output the audio component of their media assets to a primary or a secondary audio device. If vehicle media control system determines that a portable media device is outputting sound from a primary audio device, vehicle media control system may detect the audio levels of the audio output from that portable media device to determine whether the audio level exceeds the preset audio level threshold once it determines that voice call equipment 102 is engaged in a voice call. However, if vehicle media control system determines that audio from the portable media device is output to a secondary audio device, vehicle media control system may maintain uninterrupted output of the portable media device's audio output to the secondary audio device even when the voice call equipment 102 is engaged in a voice call. This allows the user of a portable device to enjoy audio playback during user 112's voice call and user 112 will be able to conduct a voice call without having to worry about interfering with audio output from any of the portable media devices.

In another embodiment, when vehicle media control system has prevented a portable media device from outputting its audio through a primary audio device during a voice call, the user may be able to resume playback during the voice call by connecting a secondary audio device to the portable device. Once vehicle media control system detects that a portable media device has been connected to a secondary audio device and is no longer outputting audio through the primary audio device that would interfere with the voice call, it may resume playback of the audio component of the media asset on the portable media device through the secondary audio device. If the media asset was paused, its playback may be resumed from the point where it was paused.

In another embodiment, the vehicle media control system may reduce the audio level of the audio component output through the primary audio device once it determines that the audio level exceeds a preset audio level threshold.

Figure 2:
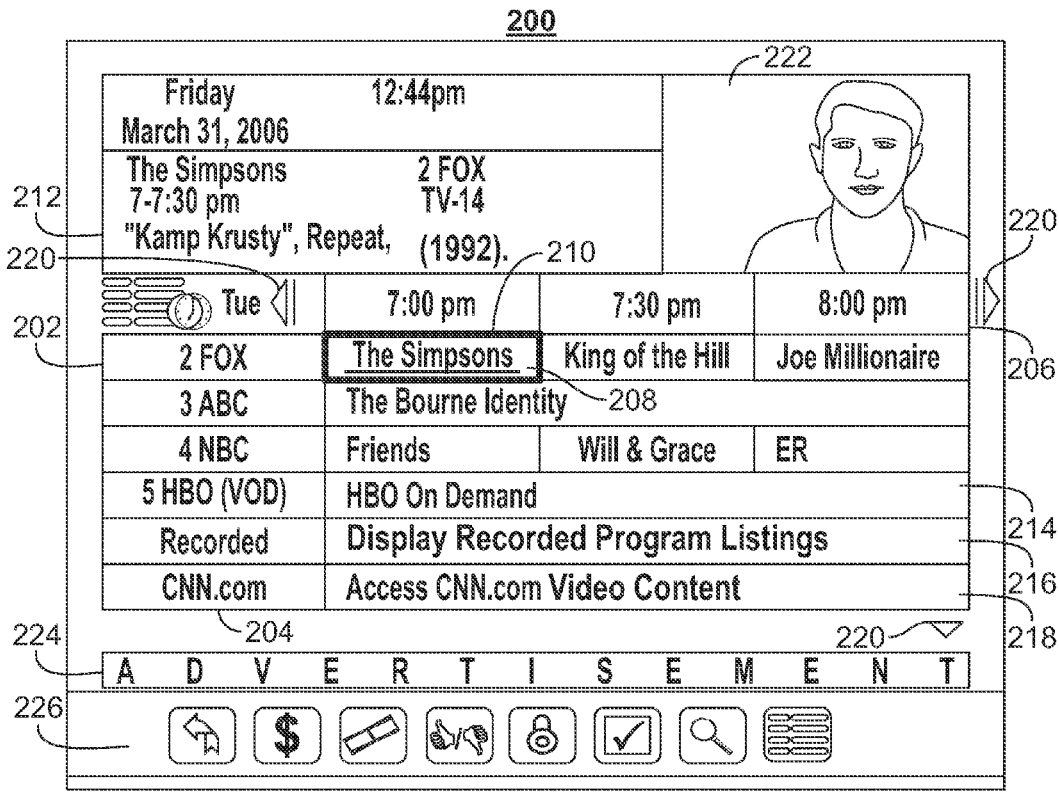
FIG. 2 shows an illustrative display screen of a portable device that may be used to provide media guidance application listings and other media guidance information in accordance with various embodiments of the invention.
Figure 3:
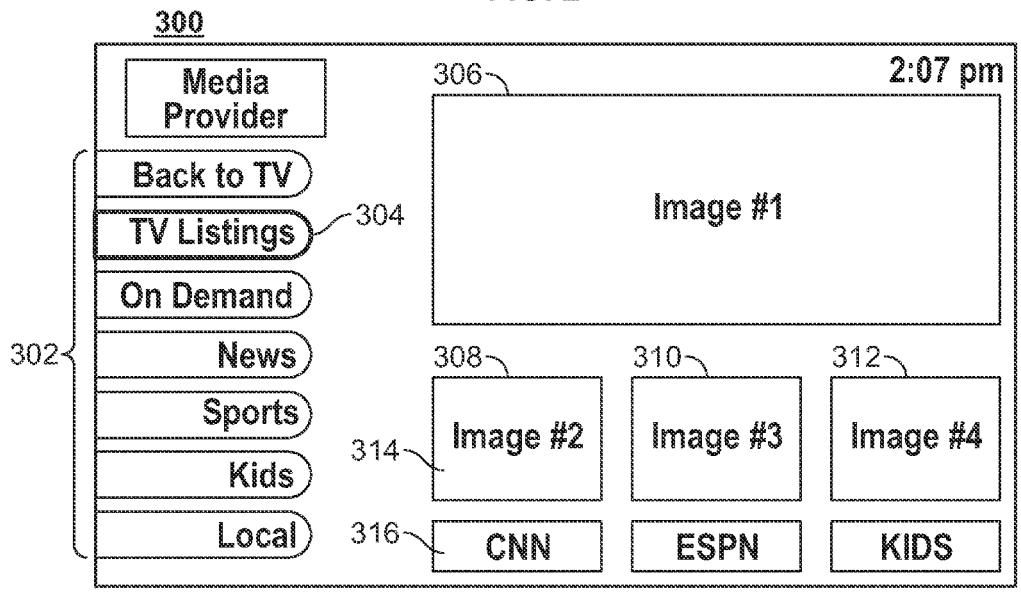
FIG. 3 shows another illustrative display screen that may be used to provide media guidance application listings on a portable device in accordance with various embodiments of the invention.

FIGS. 2-3 show illustrative display screens that may be used to provide media guidance data on portable devices 104, 106, and 108. The display screens shown in FIGS. 2-3 and 6-7 may be implemented on any suitable user equipment device or platform. While the displays of FIGS. 2-3 and 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 2 shows illustrative grid program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 4:
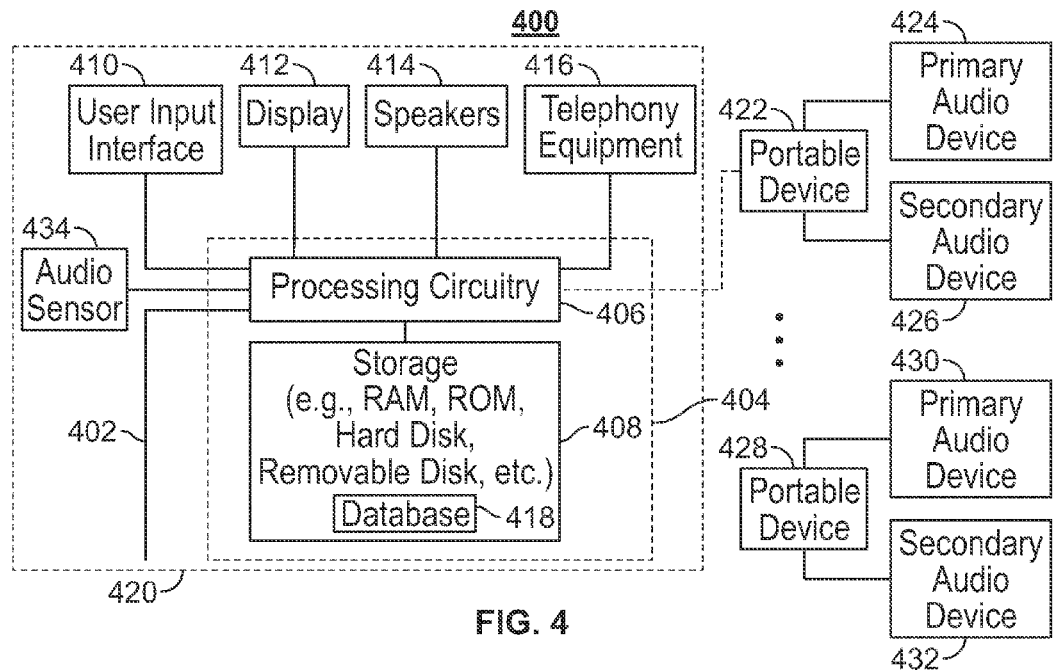
FIG. 4 shows a block diagram of on-board vehicle equipment and portable devices within the vehicle in accordance with various embodiments of the invention.

Users may access content and the media guidance application (and its display screens described above and below) from one or more of their portable media devices. These portable media devices communicate with the vehicle equipment. FIG. 4 shows a generalized embodiment of illustrative vehicle equipment 420 in connection with multiple portable devices inside vehicle environment 400. More specific implementations of the vehicle equipment are discussed below in connection with FIG. 5. Vehicle equipment 420 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Vehicle equipment 420 may include telephony equipment 416. Telephony equipment 416 corresponds to voice call equipment 102 and may be a telephone, a mobile phone, a smartphone, a satellite phone, a voice over internet protocol (VOIP) phone, a videophone, a computer with an Internet connection, or any other processing circuitry capable of receiving and initiating voice calls. Telephony equipment 416 may also be a docking interface to connect a user's mobile telephone to vehicle equipment 420. Telephony equipment 416 may be able to initiate and receive video calls such as Skype calls over the Internet or a mobile data network. Control circuitry 404 may be able to determine when an incoming call is received on telephony equipment 416. Telephony equipment may receive a signal over a telephone, Internet, or a data network that a call is being received at telephony equipment 416. Similarly, telephony equipment may be capable of initiating a call to several users. Telephony equipment may transmit a signal over a telephone, Internet, or a data network that a call has been initiated at telephony equipment 416. Telephony equipment 416 may contact a base transceiver station in order to receive and initiate voice calls.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance information, described above, and guidance application data, described above. Nonvolatile memory may also be used (e.g., to launch a boot-up routine and other instructions). Cloud-based storage, described in relation to FIG. 5, may be used to supplement storage 408 or instead of storage 408.

Storage 408 may include database 418 which includes vehicle equipment settings and user preferences. Database 418 may include information on the portable media devices last detected in vehicle 110 over a network. Database 418 may also include network information for the wireless network over which vehicle equipment 420 detects and communicates with each of the portable media devices. Such network information may include wireless network access information such as network ID and password. Database 418 may also include predefined user preferences such as preset audio level thresholds for various portable media devices. Audio level threshold is a setting that defines the user's tolerance level for ambient audio noise while a user is engaged in a voice call conducted using telephony equipment 416. When control circuitry 404 detects that a voice call is occurring on telephony equipment 416, control circuitry 404 may check the audio levels outputted by each of the portable devices' primary audio devices. Control circuitry 404 may compare each portable media device's audio output level to the audio level threshold stored in database 418 for that portable media device to determine whether the portable device's audio output should be repressed.

In some embodiments, database 418 may contain a list of several commercial portable media devices and may also contain different preset audio threshold levels for each of the different portable media devices as illustrated by database 900 in FIG. 9. As shown in FIG. 9, database 900 may be a table that lists several portable media devices in column 910 and the associated preset audio threshold levels for each of these portable media devices in column 920. Column 910 may list each portable media device by its unique model number in order to differentiate between different models of portable media devices. Database 900 may be stored in storage 408. Database 900 is not just limited to the list of devices shown in FIG. 9. Instead database 900 may be a comprehensive list of all commercially known portable media devices. Database 900 may be updated by control circuitry 404 with additional information for new portable media devices received from a remote server.

In the embodiment shown in FIG. 9, the audio level threshold values may be listed as a percentage of the maximum audio level a particular portable media device is capable of outputting. In another embodiment, the audio level threshold value may be a measure of audio power that an audio device connected to the portable media device is allowed to output.

The audio level threshold values for the various devices listed in database 900 may be predefined. However, processing circuitry 406 may modify the predefined values for the audio level thresholds stored in database 900 once processing circuitry 406 detects a user input to change the preset audio level threshold from user input interface 410.

In an embodiment, database 900 may list different preset audio level threshold for different portable media devices. For instance, the value of preset audio level threshold 914 for a Sony Portable Blu-Ray Disc Player listed in cell 912 of database 900 may differ from the value of preset audio level threshold 918 for an Apple Ipad 2 listed in cell 916 of database 900.

In another embodiment, the preset audio level threshold may be set to the same value for all portable media devices.

Referring back to FIG. 4, telephony equipment 416 may be able to indicate which incoming calls are important. The user may store contact information using user interface 410 to database 418. Control circuitry 404 may be able to indicate if an incoming call is received from a contact by displaying the contact name on a display 412. Additionally, the user may designate certain contacts stored in database 418 as important contacts using user interface 410. When a call is received from a contact marked as an important contact in database 418, control circuitry 404 may be able to indicate that the call is coming from an important contact. In one embodiment, control circuitry 404 may emit a distinct alarm sound from speakers 414 to indicate that a call from an important contact is being received. In another embodiment, control circuitry 404 may automatically pause playback of media assets on all portable devices when it detects that an incoming call from an important contact is being received. In another embodiment, control circuitry 404 may mute the audio assets on all the portable media devices once it determines that an incoming call is received from an important contact. In another embodiment, control circuitry 404 may lower the audio level of the media asset to an audio level that is less than or equal to the audio level threshold of that portable media device stored in database 900. Once control circuitry 404 determines that the voice call has been terminated, control circuitry 404 may resume playback of the media assets on all portable devices from the respective points in which the media assets on the various portable devices were paused.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the vehicle equipment 420. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from vehicle equipment 420, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of vehicle equipment 420. Display 412 may be one or more of a monitor, a television, a liquid crystal display (LCD) for a mobile device, a display on an automobile dashboard, a heads-up display, a display screen of a global positioning device or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of vehicle equipment 420 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly implemented on vehicle equipment 420. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on vehicle equipment 420 is retrieved on-demand by issuing requests to a server remote to the vehicle equipment 420. In one example of a client-server based guidance application, control circuitry 404 runs a web browser that interprets web pages provided by a remote server.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Control circuitry 404 may communicate with multiple portable media devices such as portable media device 422 and 428 through a wireless network. Portable media device 422 may be connected to a primary audio device 424 and a secondary audio device 426. Similarly, portable media device 428 may be connected to a primary audio device 430 and a secondary audio device 432. Portable media devices 422 and 428 may be implemented with substantially similar circuitry to that of processing circuitry 406 of vehicle equipment 420, and may include a display such as display 412, speakers such as speakers 414, user input interface such as user input interface 410, and storage such as storage 408. Primary audio devices such as a speaker may be integrated into the hardware of the portable media devices such as built-in speakers on a portable music player or portable DVD player. In addition, primary audio device may be external audio devices such as a boombox, loudspeaker, amplifier, stereos, surround sound system, audio docking equipment such as an iPod speaker, computer speakers, and digital speakers. Secondary audio devices may be external audio devices for private audio listening such as headphones, earphones, microphones, and in-ear monitors. Control circuitry 420 may be able to detect whether a portable media device is outputting the audio component of the media asset being played back into a primary or secondary audio device. For example, the default audio device for portable media devices may be the devices' built-in speakers, primary audio devices 424 and 430. However, once headphones or any other secondary audio device 426 and 432 are connected to the portable media device, the portable media device may indicate whether the audio component of the media asset it is playing is being routed to only the primary audio device, only the secondary device, or both primary and secondary audio devices. Although FIG. 4 only shows and describes a primary and a secondary audio device, there may be more than two audio devices connected to a portable media device.

Control circuitry 404 may be able to detect whether the portable media device is outputting the audio of media asset being played on the portable media device to the primary audio device or to a secondary audio device connected to the portable media device. Control circuitry 404 may make such a determination from information provided by the media guidance application running on the portable media device. The media guidance application may provide the user of the portable media device with an option to output the audio of media assets playing on that portable media device to a secondary audio device such as headphones instead of the default primary audio device of the portable device. If the user selects such an option to output the audio of the portable media device to a secondary audio device, then control circuitry 404 may store such an indication in storage 408. Alternatively, such an indication of which audio device is currently outputting the audio component of the media asset playing on the portable media device may be stored on the portable media device itself. Control circuitry 404 may be configured to detect such an indication by detecting such an indication stored in the portable device.

In an embodiment, once control circuitry 404 detects that an audio call is received or initiated at telephony equipment 416, control circuitry 404 may determine whether a user has selected the option to output the audio component of the media asset on a portable device to a secondary audio device. If control circuitry 404 determines that such an option to output audio only to a secondary audio device instead of the default primary audio device has been enabled, then control circuitry 404 may continue uninterrupted playback of the audio component of the media asset playing on the portable device once it determines that telephony equipment 416 is engaged in a voice call. Alternatively, control circuitry 404 may continue uninterrupted playback of the media asset playing on the portable media device if it determines that no audio component is output from the primary audio device of the portable media device.

In another embodiment, control circuitry 404 may be configured to determine whether audio levels output from portable media device in a specific portion of vehicle 110 exceed the audio level threshold for each of those portable media devices defined in database 900. A plurality of audio sensors such as audio sensor 434 may be located in various different locations of vehicle 110. Audio sensor 434 may be an audio transducer such as a microphone. Audio sensor 434 may be able to convert the acoustic waves in its vicinity into an electrical signal to detect the audio amplitude of nearby audio. Audio sensor 434 may be able to communicate with control circuitry 404 over a wireless network or wired network. Audio sensor 434 may include a wireless transceiver over which audio level information may be communicated to control circuitry 404. Audio sensor 434 may continuously or periodically transmit audio level information to control circuitry 404 or it may only transmit audio level information when requested by control circuitry 404. Control circuitry 404 may use audio level detected from sensor 434 to detect the audio level in a particular location of automobile 110.

In an embodiment where there are a plurality of audio sensors located throughout the vehicle, audio sensor 434 may continuously or periodically transmit location information to identify its data as belonging to a certain region of the vehicle. Control circuitry 404 may receive audio level information from a plurality of sensors communicating audio level information from each of their respective locations. Control circuitry 404 may be able to construct a dynamically updating audio level map of the vehicle. Control circuitry 404 may use this map to determine which portable device's audio component output needs to be repressed. Control circuitry 404 may be capable of identifying the portable audio device nearby each sensor. For instance, control circuitry 404 may be able to divide a map of the vehicle into several subregions, with each subregion closest to an audio level sensor. When control circuitry 404 detects that an audio sensor reports an audio level that exceeds the audio level threshold stored in database 900 for any portable media device, control circuitry 404 may be able to repress the output audio component of all of the portable media devices located in the identified audio sensor's subregion while not suppressing devices in the other subregions. In an implementation, portable media devices may be able to continuously or periodically transmit their relative position to vehicle equipment 420 over a wireless network. In such an implementation, portable media devices may continuously or periodically transmit their relative position to vehicle equipment 420. In another implementation, control circuitry 420 may be able to determine the position of each of the portable media devices in the vehicle.

Figure 5:
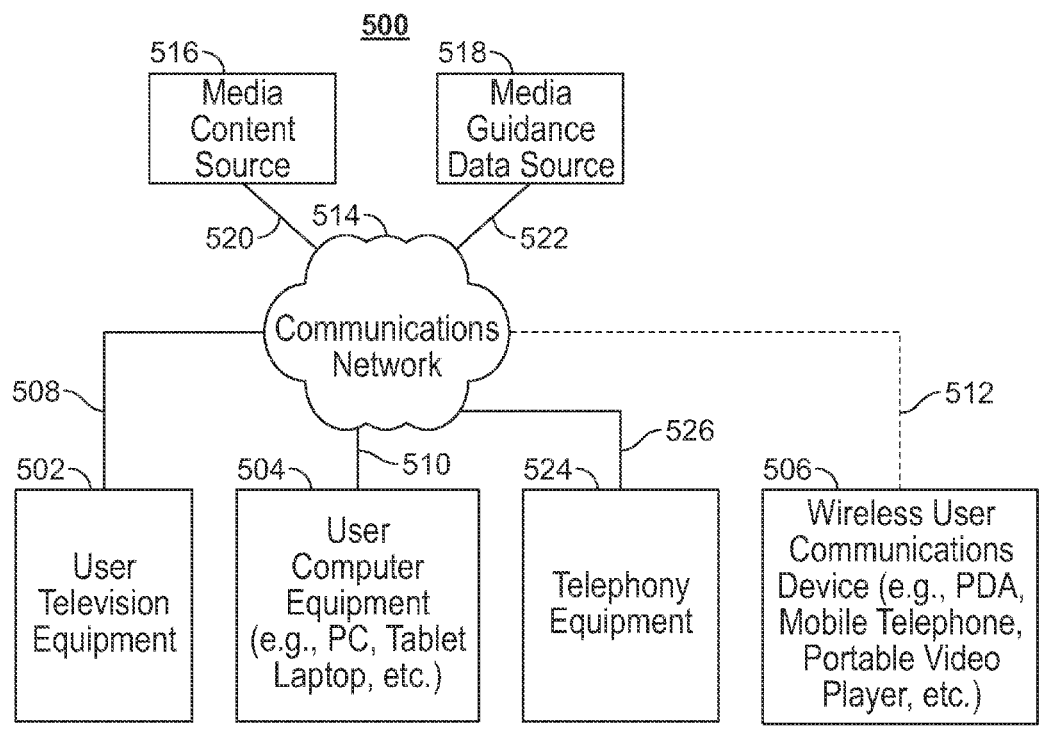
FIG. 5 shows a block diagram of a cross-platform interactive media system in accordance with various embodiments of the invention.

Vehicle equipment 420 of FIG. 4 can be implemented in system 500 of FIG. 5 as user television equipment 502, user computer equipment 504, wireless user communications device 506, or any other type of user equipment suitable for accessing content. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

Portable devices 422 and 428 of FIG. 4 can be implemented in system 500 as user television equipment 502, user computer equipment 504, wireless user communications device 506, or any other type of user equipment suitable for accessing content, such as a non-portable gaming machine. Primary audio devices 424 and 430 and secondary audio devices 426 and 432 may be implemented as user television equipment 502, user computer equipment 504, or any other type of user equipment device capable of receiving an electronic signal and outputting an audio output. User television equipment 502, user computer equipment 504, and wireless user communications device 506 may be implementations of vehicle equipment 420.

Telephony equipment 416 may be implemented in system 500 as telephony equipment 524. Telephony equipment 504 may be a telephone, a mobile phone, a smartphone, a satellite phone, a voice over internet protocol (VOIP) phone, a videophone, a computer with an Internet connection, or any other processing circuitry capable of receiving and initiating voice calls. Telephony equipment 524 may communicate with communications network 514 through communication path 526. Telephony equipment 524 may communicate with a base transceiver station to receive and initiate voice calls through communications network 514.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a website accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. The second screen device may display global positioning information in addition to displaying content supplementing the content presented on the first user equipment device. The second screen device may also be a partially transparent display, such as a head-up display on the dashboard of a vehicle. The head-up display device may display information on the windshield to the driver or pilot of the vehicle, user 112 of FIG. 1, without requiring him to look away from his usual viewpoint.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, wireless user communications device 506, and telephony equipment 524 are coupled to communications network 514 via communications paths 508, 510, 512, and 526 respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, 512, and 526 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508, 510, and 526 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, 512, and 526 as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, 506, and 524 are shown as through communications network 514, in some embodiments, sources 516 and 518 may communicate directly with user equipment devices 502, 504, 506, and 524 via communication paths (not shown) such as those described above in connection with paths 508, 510, 512, and 526.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, 506, and 524 the media guidance application itself or software updates for the media guidance application.

Media guidance applications may be, for example, stand-alone applications implemented on user equipment devices. For example, the media guidance application may be implemented as software or a set of executable instructions which may be stored in storage 408, and executed by control circuitry 404 of vehicle equipment 420. In some embodiments, media guidance applications may be client-server applications where only a client application resides on the user equipment device, and server application resides on a remote server. For example, media guidance applications may be implemented partially as a client application on control circuitry 404 of vehicle equipment 420 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, 506, and 524 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, a tablet application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Referring back to FIG. 1, FIG. 1 shows an exemplary vehicle environment 100 in which several embodiments are executed. Users 112, 114, 116, and 118 are sitting inside vehicle 110, which is illustrated as a car in FIG. 1. However, vehicle 110 may be any vehicle such an aircraft, automobile, watercraft or the like. Portable media devices 104, 106, and 108 each have built-in speakers and headphone jacks to output audio into a secondary audio device. Portable media devices 104, 106, and 108 are capable of connecting to vehicle equipment 420 over a wireless network such as Bluetooth, Internet, or any other local area network.

Before a voice call is received, user 114 may be playing a video game on portable gaming device 104 that outputs audio through the built-in speakers of portable media device 104. User 118 may be playing music on a portable media device 108 and listening to the audio through headphones 128. User 116 may be playing a movie on portable Blu-Ray player 106. Blu-Ray player 106 may be outputting audio of the movie it is playing through built-in speakers of portable Blu-Ray player 106. User 112 may be driving automobile 110.

Once a call is received on voice call equipment 102, control circuitry 404 is able to detect a signal indicating that a voice call equipment 102 is receiving an incoming call. User 112 may answer the incoming call by pressing a button on voice call equipment 102 which corresponds to user input interface 410. Once control circuitry 404 determines that the incoming call has been answered on voice call equipment 102, control circuitry 404 determines if any of the portable devices are outputting audio that may interfere with the voice call in progress.

In an embodiment, control circuitry 404 may determine whether any of the portable media devices inside vehicle 110 are outputting audio through a primary audio device or through a secondary audio device. One method of determining whether a portable media device outputs its audio to a primary or a secondary audio device is to detect whether a setting in the portable device has been switched to output audio through the secondary audio device. Users may specify which audio device will output the portable media device's audio using the media guidance application on their portable media device. Each portable media device may transmit a signal to vehicle equipment 420 continuously or periodically indicating which audio device it is using to transmit the audio component the media asset is playing back once control circuitry 404 has determined that voice call equipment 102 is engaged in a voice call. Each portable media device may determine whether such a setting to output the device's audio to a secondary audio device has been selected. If such a setting has been selected, the portable media device may further verify whether there is any audio output from the primary audio device of the portable media device. Once a portable media device has identified that there is in fact no audio being output from the primary audio device the portable media device, it may transmit an indicator to vehicle equipment 420 that a secondary audio device is being used to output the audio component of the media asset it is playing. Similarly, if a portable media device is outputting audio through its primary audio device, it may transmit an indicator to vehicle equipment 420 that audio is being outputted through its primary audio device.

If control circuitry 404 receives an indicator from any portable media device that audio is being output from its primary audio device, control circuitry 404 may automatically send a signal instructing that portable media device to repress audio playback of its media asset. For example, control circuitry 404 may instruct the portable media player to pause playback of the media asset outputting audio. In another implementation, control circuitry 404 may mute the portable media device's audio component. In yet another implementation, control circuitry 404 may lower the audio level of the media asset to an audio level that is less than or equal to the audio level threshold of that portable media device stored in database 900.

If control circuitry 404 receives an indicator from any portable media device that audio is being output to a secondary audio device, then control circuitry 404 may allow the media asset to continue playing its audio component without any interruption. This allows users that are listening to the audio component of their media assets on a secondary audio device, such as user 118 who is listening to the audio component of his media asset using headphones 128, to be able to enjoy uninterrupted playback of media assets on their portable media device while a voice call is in progress on the automobile's voice call equipment.

In another embodiment, vehicle equipment 420 may rely on audio sensors 130, 132, 134, and 136 to detect whether the audio output from portable media devices interferes with the audio of the voice call. In order to perform such a determination, control circuitry 404 queries audio sensors 130, 132, 134, and 136 to detect the audio level at their respective locations. Control circuitry 404 may split the entire region spanned by vehicle 110 into several subregions, such that each subregion is associated with an audio sensor. The audio sensor for each region, when queried by control circuitry 404, detects the audio level emitted by the portable media devices and transmits that audio level information to control circuitry 404. In turn, control circuitry 404 compares the audio level received from each audio sensor and determines whether the audio level exceeds an audio level threshold for any portable media device set in database 900. If the audio level information received from the audio sensor at any time during the course of the voice call exceeds such an audio level threshold, control circuitry 404 may prevent audio playback of all devices in the subregion identified with that audio sensor. In another implementation, control circuitry 404 may lower the audio level of the audio component output from all devices in the subregion identified with that audio sensor such that the audio output from none of the portable media devices in that subregion interferes with the audio output of the voice call. Alternatively, control circuitry 404 may prevent audio playback of all portable media devices in automobile 110 if it determines that any audio sensor has detected an audio level greater than the audio level threshold of any portable media device stored in database 900. In another implementation, control circuitry 404 may lower the audio level of the audio component output from all devices in automobile 110 such that the audio output from none of the portable media devices interferes with the audio output of the voice call.

In another embodiment, portable media device may continuously or periodically transmit audio level information to the vehicle equipment. Once control circuitry 404 detects that a device is outputting audio to its primary audio device during a voice call, control circuitry 404 may query the particular portable device to transmit the audio level of the audio component of the media asset it is playing. Control circuitry 404 may compare such audio level information with the audio level threshold for that portable media device set in database 900. If the audio level information received from the portable device at any time during the course of the voice call exceeds the audio level threshold stored for that portable media device in database 900, control circuitry 404 may prevent audio playback of the media asset by pausing the media asset or muting the audio component of the media asset. Alternative control circuitry 404 may lower the audio level of the media asset to an audio level that is less than or equal to the audio level threshold of that portable media device stored in database 900. If the audio level information received from the portable media device during the voice call conducted on voice call equipment 102 does not exceed the audio level threshold for that portable media device stored in database 900, control circuitry 404 may allow the portable device to continue playback of the media asset and its audio component without any interruption.

When a voice call is initiated on voice call equipment 102, control circuitry 404 is able to detect a signal indicating that a voice call equipment 102 is initiating a call. User 112 may initiate the call by either pressing a button on voice call equipment 102. Once control circuitry 404 determines that the a call has been initiated on voice call equipment 102, control circuitry 404 determines if any of the portable devices are outputting audio that may interfere with the voice call in progress. Control circuitry 404 may then determine whether any audio output by any portable media devices interferes with the audio of the voice call as described in the embodiments above. If control circuitry 404 determines that the audio output by the portable media devices interferes with the audio of the voice call initiated by user 112, then control circuitry 404 may prevent the audio playback on these portable media devices. On the other hand, if control circuitry 404 determines that the audio output of a portable media device does not interfere with audio of the voice call initiated by user 112, control circuitry 404 may allow the portable media devices to continue playing back the audio component of their media assets without any interruption.

In an embodiment, control circuitry 404 may detect that more than one portable media device is outputting an audio component of a media through its primary audio device that interferes with the audio of the voice call conducted on voice call equipment 404. Once control circuitry 404 has made such a determination, control circuitry 404 may simultaneously pause playback of the media assets or mute the audio component of the media assets on each of these portable media devices. Alternatively, control circuitry 404 may lower the audio level of each of the portable devices' media assets to an audio level that is less than or equal to the audio level threshold of each of the portable media device stored in database 900.

Once control circuitry 404 has paused or muted the audio playback of the media assets, control circuitry 404 waits until a secondary audio device is connected to the portable media device on which audio playback has been prevented or until the audio level of the audio component output from the primary audio device has been lowered to an audio level below the identified audio level threshold for that portable media device stored in database 900.

In an embodiment, control circuitry 404 may determine that a secondary audio device has been connected to a portable media device that was previously outputting the audio component of its media asset through a primary audio device. Control circuitry 404 may make such a determination when it receives an indication from a portable device that a secondary audio device has been connected. For example, if user 116 connects headphones to the headphone jack of portable Blu-Ray player 106, portable Blu-Ray player 106 may send a signal to control circuitry 404 that a secondary audio device has been connected. In addition, Blu-Ray player 106 may also send an additional signal to control circuitry 404 that the audio component of the media asset being played is now only output through the secondary audio device connected to portable Blu-Ray player 106 and are no longer being output through the primary audio device on Blu-Ray player 106. Upon receiving these signals, control circuitry 404 may resume playback of the media asset on portable Blu-Ray player that was previously paused when a voice call had been detected or it may un-mute the audio component of the portable media asset that had been previously muted when a voice call had been detected. Control circuitry 404 may resume playback of the media asset from the point where the media asset was paused.

In another embodiment, control circuitry 404 may lower the audio level of the audio component output from the primary audio device connected to the portable media device once it determines that the audio level of the audio component exceeds the audio level threshold for that particular portable media device in database 900. For example, once control circuitry 404 determines that portable Blu-Ray player 106's built-in speaker is outputting audio at an audio level that exceeds the audio level threshold for that particular Blu-Ray player listed in database 900, control circuitry 404 may instruct Blu-Ray player 106 to decrease its volume to a level at which the audio output from Blu-Ray player 106's built-in speaker is less than the audio level threshold for Blu-Ray player 106 stored in database 900. This ensures that the audio output from Blu-Ray player 106's built-in speakers does not interfere with the audio of the voice call.

Figure 6:
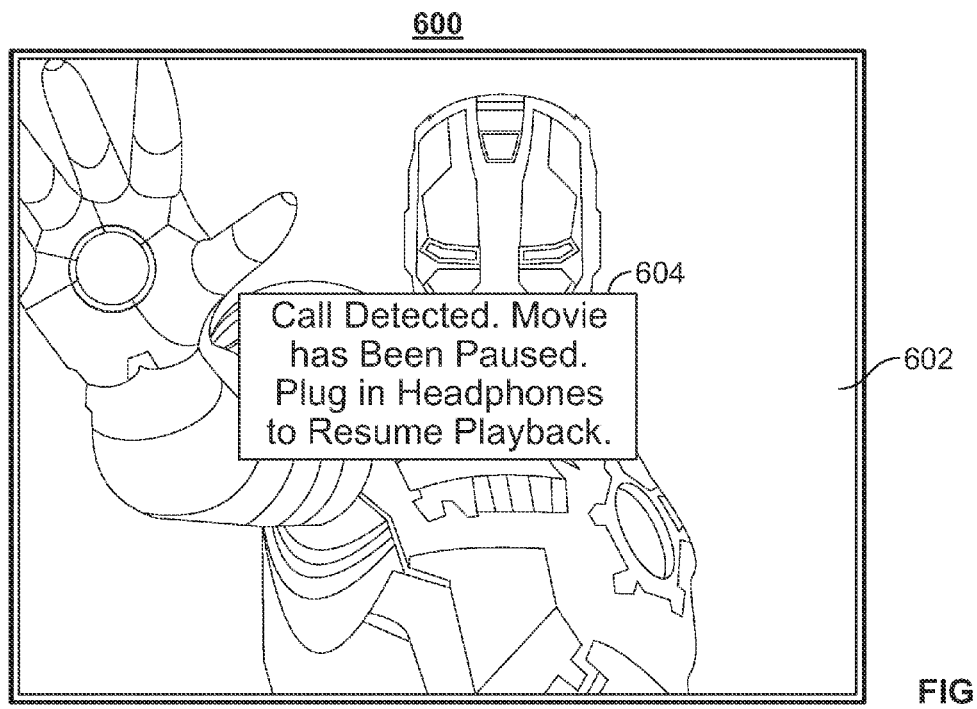
FIG. 6 shows an illustrative display screen of a portable device when a call has been detected in accordance with an embodiment of the invention.

FIG. 6 shows an illustrative display screen 600 displayed on portable Blu-Ray player 106 once a voice call has been detected on voice call equipment 102. Before control circuitry 404 had detected the presence of a voice call on voice call equipment 102, portable Blu-Ray player 106 was playing back the movie "Iron Man" on display screen 602 of portable Blu-Ray player 106. The audio component of the "Iron Man" movie was being output through the built-in speakers of portable Blu-Ray player 106.

In the embodiment depicted in FIG. 6, once control circuitry 404 detects the presence of a voice call on equipment, control circuitry 404 receives an indication from portable Blu-Ray player 106 that it is outputting the audio component of the "Iron Man" movie through its speakers while a voice call is in progress on voice call equipment 102, control circuitry 404 pauses playback of the "Iron Man" movie. Control circuitry 404 may further instruct the media guidance application running on portable Blu-Ray player 106 to display message 604 on screen 600. Message 604 is a message that indicates that a call has been detected and that playback of the media asset has been paused. Message 604 may further indicate that in order to resume playback, the user must plug in his secondary audio device. Message 604 may be overlaid on top of the displayed media asset 102 as show in FIG. 6. Alternatively, message 604 may be shown in a non-overlapping region of screen 600 along with the display of the paused media asset 602 on a different region of screen 600.

In another embodiment, control circuitry 404 may mute the audio of the media asset playing on portable Blu-Ray player 106 without pausing video playback of the media asset when it detects that portable Blu-Ray player 106 was outputting the audio component of its media asset through a primary audio device while a voice call was in progress on voice call equipment 102. In this embodiment, control circuitry 404 may instruct the media guidance application running on portable Blu-Ray player 106 to display message 604 on screen 600. Message 604 may indicate that a call has been detected and that the audio of movie has been muted. Message 604 may further indicate that in order to un-mute audio playback, the user must plug in his secondary audio device.

Figure 7:
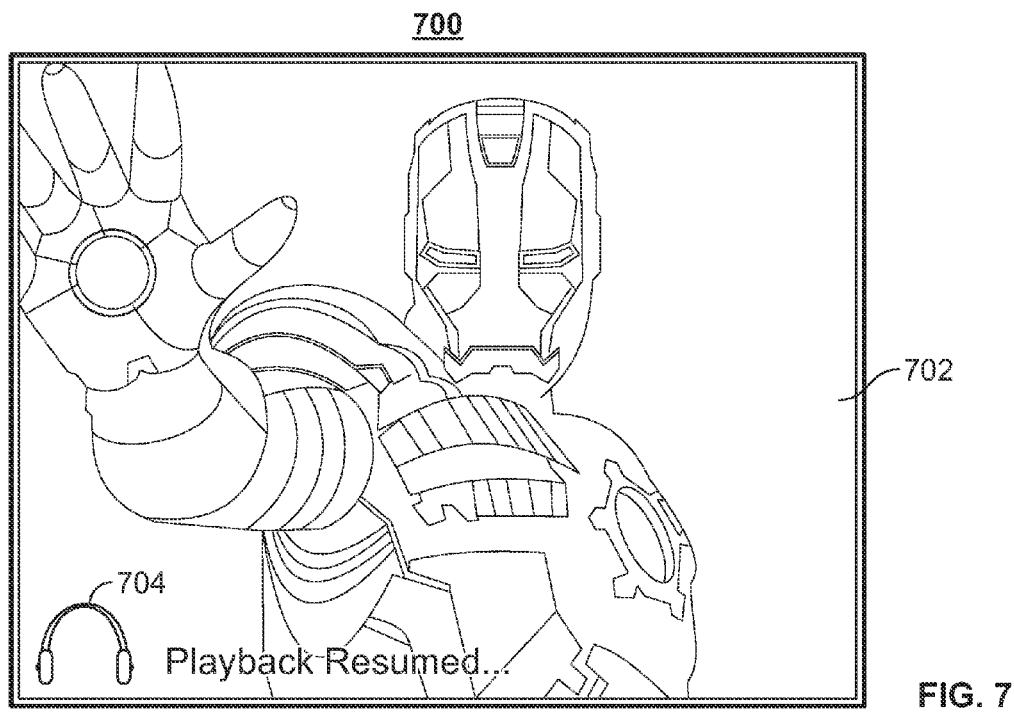
FIG. 7 shows an illustrative display screen of a portable device when the audio component of the media asset on the portable device is being routed to the secondary audio device in accordance with an embodiment of the invention.

Once a secondary audio device has been connected to a portable media device such as portable Blu-Ray player 106, control circuitry 404 may resume audio playback of the media asset while the audio component of the media asset is output through the secondary audio device. Control circuitry 404 may further instruct the media application guide running on portable Blu-Ray player 106 to display a screen such as screen 700 displayed in FIG. 7. Control circuitry 404 may instruct the media application guide to remove the display of message 604 and resume playback of the paused "Iron Man" movie with the audio of the "Iron Man" movie being output through the secondary audio device connected to portable Blu-Ray player 106. Control circuitry 404 may resume playback of the "Iron Man" movie from the point where the movie was paused. In addition, control circuitry 404 may further instruct media application guide running on portable Blu-Ray player 106 to display an indicator 704. Indicator 704 may be any combination of graphics and text. Indicator 704 may indicate the playback of the previously paused media asset has resumed. In FIG. 7, indicator 704 includes a headphone icon to indicate that the audio of the "Iron Man" movie is being output to a secondary audio device and also includes text to indicate that playback of the previously paused "Iron Man" movie has resumed. Indicator 704 may be overlaid on top of the display of the media asset 704.

In another embodiment, indicator 704 may indicate that that the audio component of the previously muted media asset has been un-muted once control circuitry 404 determines that a secondary audio device has been connected to the portable media device.

Control circuitry 404 may be further able to detect when a voice call has been terminated. Control circuitry 404 may receive a signal from telephony equipment 416 indicating that the voice call is no longer in progress. Alternatively, control circuitry may detect the absence of a signal from telephony equipment 416 indicating that a voice call is in progress. Once control circuitry 404 determines that a voice call is no longer in progress and that the media asset has been paused, control circuitry 404 may resume playback of the media asset on the portable device from the point in the media asset where playback was paused. Control circuitry 404 may instruct the portable media device to resume outputting the audio component of the media asset to the audio device which was previously outputting the audio component. For example, once control circuitry 404 detects that the "Iron Man" movie on portable Blu-Ray player has been paused due to audio interference with the voice call and that the voice call has been terminated, control circuitry 404 may resume playback of the "Iron Man" movie from the point in the "Iron Man" movie where playback was paused. If control circuitry detects that no secondary audio device had been connected to the portable Blu-Ray device after the "Iron Man" movie had been paused until the time control circuitry 404 that the voice call on voice call equipment 102 has been terminated, control circuitry 404 instructs portable Blu-Ray player to resume outputting the audio component of the "Iron Man" movie through the speakers of portable Blu-Ray player 106. Upon resuming playback of the media asset, control circuitry 404 may instruct the media guidance application running on portable Blu-Ray player 106 to display an indicator similar to indicator 704 to indicate that playback has resumed.

Figure 8:
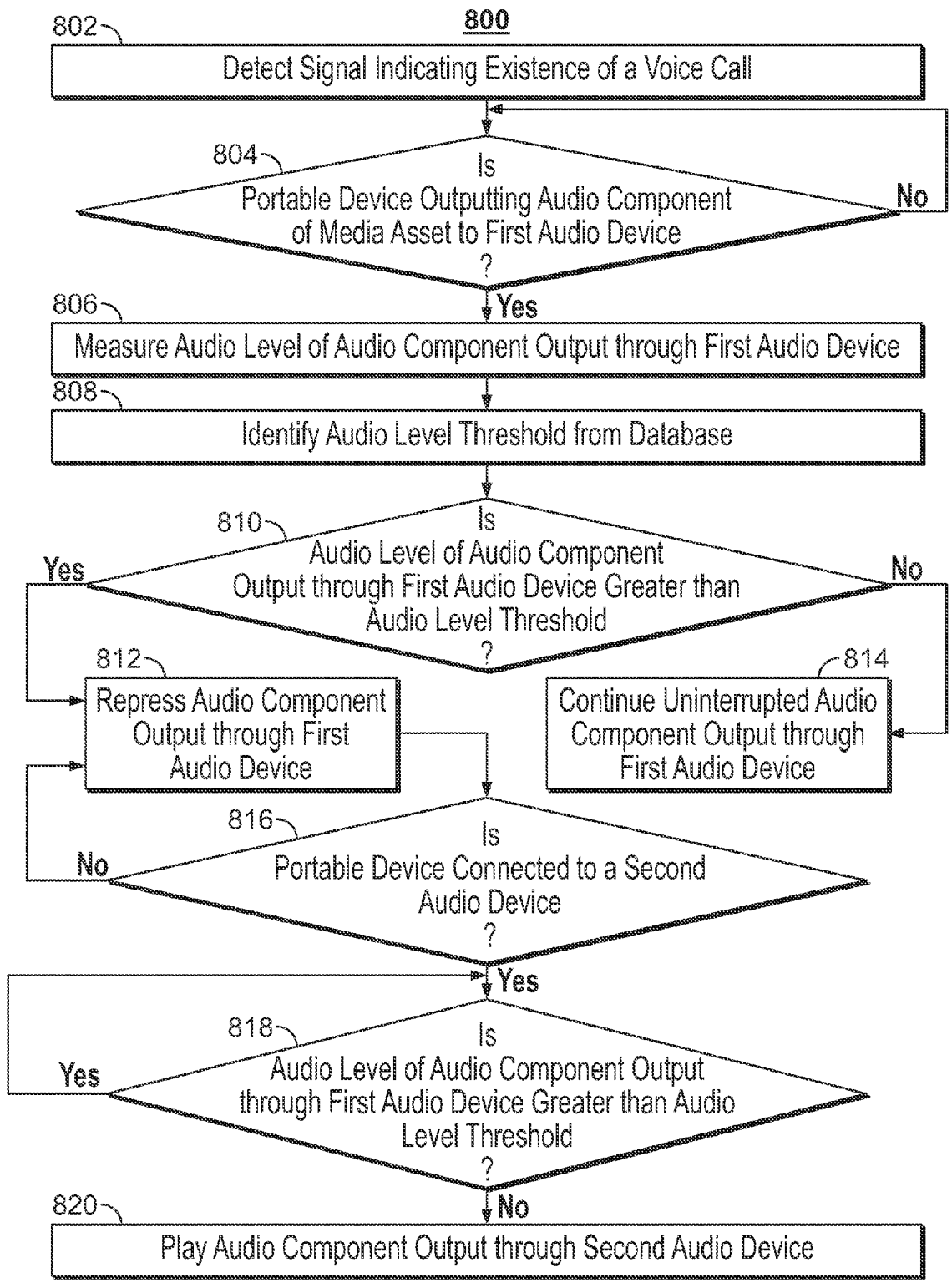
FIG. 8 shows an illustrative flow diagram depicting an exemplary process for controlling audio output from portable devices in the event of a voice call in accordance with various embodiments of the invention.

The following flow chart of FIG. 8 serves to illustrate processes involved in some embodiments of the invention. Where appropriate, these processes may, for example, be implemented completely in the processing circuitry of a user equipment device (e.g., control circuitry 404 of FIG. 4) or may be implemented at least partially in a remote server. It should be understood that the steps of the flow charts are merely illustrative and any of the depicted steps may be modified, omitted, or rearranged, two or more of the steps may be combined, or any additional steps may be added, without departing from the scope of the invention. Also, some of the steps may be executed or performed substantially simultaneously where appropriate or in parallel to reduce latency and processing times.

At step 802, control circuitry 404 detects a signal indicating existence of a voice call on telephony equipment 416. Such a signal may be detected when a voice call has been initiated by a user in the vehicle or when a user in the vehicle answers an incoming voice call on telephony equipment 416.

At step 804, control circuitry 404 determines a portable media device is outputting the audio component of a media asset to a primary audio device. As described above, control circuitry 404 may receive an indication from a portable media device within the vehicle over a wireless network which audio device is outputting the audio component of the media asset. The primary audio device is typically some form of a speaker. If control circuitry 404 detects that the portable media device is not outputting the audio component of its media asset to a primary audio device, it may wait until the portable media device outputs the audio component of its media asset to a primary audio device.

At step 806, upon determining that the portable media device is outputting the audio component of its media asset to a primary audio device, namely a speaker, control circuitry 404 measures the audio level of the audio component output through the primary audio device. As described above, control circuitry 404 may measure the audio level by receiving such audio level information from the portable media device over a wireless network. Alternatively, control circuitry 404 may measure the audio level by receiving such audio level information from an audio sensor over a wireless network.

At step 808, control circuitry 404 identifies a audio level threshold for a particular portable media device from database 900.

At step 810, control circuitry 404 determines whether the audio level of the audio component output through the primary audio device is greater than the audio level threshold associated with the portable media device connected to the primary audio device in database 900.

At step 812, control circuitry 404 represses the audio component of the media asset output through the primary audio device in response to determining that the audio level of the audio component output through the primary audio device is greater than the audio level threshold obtained from database 900. For example, control circuitry 404 may pause playback of the media asset on the portable media device. In another implementation, control circuitry 404 may mute the audio component of the media asset on the portable device. In another implementation, control circuitry 404 may lower the audio level of the media asset to an audio level that is less than or equal to the audio level threshold of that portable media device stored in database 900.

At step 814, control circuitry 404 continues outputting the audio component of the media asset through the primary audio device without any interruption if control circuitry 404 determines that the audio level of the audio component output through the primary audio device is less than or equal to the audio level threshold for the portable media device connected to the primary audio device obtained from database 900.

At step 816, control circuitry 404 determines whether the portable device is connected to a secondary audio device after control circuitry 404 represses the audio component of the media asset. As described above, the secondary audio device is a personal audio listening device, such as headphones, earphones, microphones, or in-ear monitors. If control circuitry 404 does not detect that the audio component of the media asset is connected to a secondary audio device, control circuitry 404 returns to step 912 and continues repressing the audio component output through the primary audio device.

At step 818, control circuitry 404 determines whether the audio level of the audio component output through the secondary audio device is greater than the audio level threshold in response to determining that the portable media device is connected to a secondary audio device. If the audio level of audio component output through the secondary audio device is greater than the audio level threshold for the portable media device connected to the secondary audio device as listed in database 900, then control circuitry 404 waits until the audio component of the media asset output through the secondary audio device is lesser than or equal to the audio level threshold, all the while repressing output of the audio component of the media asset from both the first and secondary audio devices.

At step 820, control circuitry 404 outputs the audio component of the media asset through the secondary audio device upon determining that the audio level of the audio component to be output through the secondary audio device is less than or equal to the audio level threshold for the portable media device connected to the secondary audio device as listed in database 900.

It is to be understood that while certain forms of the present invention have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein, which are presented for purposes of illustration and not of limitation.

What is claimed is:

1. A method for playing media assets in a vehicle, the method comprising:
    detecting, using control circuitry, a first signal indicating the existence of a voice call in a vehicle equipment;
    determining whether a portable device inside of the vehicle is playing a media asset that includes an audio component being output through a first audio device;
    comparing audio level of the output of the audio component of the media asset with an audio level threshold stored in a database to determine whether the output of the audio component of the media asset through the first audio device will interfere with audio output of the voice call through the vehicle equipment;
    repressing output of the audio component through the first audio device upon determining that the output of the audio component through the first audio device will interfere with the audio output of the voice call; and
    maintaining uninterrupted output of the audio component through the first audio device upon determining that the output of the audio component through the first audio device will not interfere with the audio output of the voice call.

2. The method of claim 1, wherein the first audio device is a speaker.

3. The method of claim 1 wherein repressing output of the audio component through the first audio device comprises pausing playback of the media asset on the portable device.

4. The method of claim 3, further comprising:
    determining that the output of the audio component through the first audio device no longer interferes with the audio output of the voice call; and
    resuming playback of the paused media asset.

5. The method of claim 1 wherein repressing output of the audio component through the first audio device comprises muting the audio component output through the first audio device.

6. The method of claim 1, wherein comparing the audio level of the output of the audio component of the media asset with an audio level threshold stored in a database further comprises:
    measuring the audio level of the output of the audio component of the media asset;
    identifying the audio level threshold stored in the database; and
    determining whether the audio level of the output of the audio component of the media asset exceeds the audio level threshold.

7. The method of claim 1, wherein repressing output of the audio component through the first audio device further comprises:
    determining whether the output of the audio component of the media asset through a second audio device associated with the portable device will interfere with the audio output of the voice call;
    detecting that the second audio device has been activated; and
    playing back the audio component output of the media asset through the second audio device instead of the first audio device upon determining that the output of the audio component of the media asset through the second audio device will not interfere with the audio output of the voice call.

8. The method of claim 7, wherein detecting that a second audio device has been activated further comprises detecting that at least one of a headphone, an earphone, a microphone, and an in-ear monitor has been connected to the portable device or detecting that an option to output the audio component of the media asset through the second audio device has been selected.

9. The method of claim 1, wherein detecting the first signal indicating the existence of a voice call further comprises detecting a second signal indicating that the voice call has been initiated using the vehicle equipment.

10. The method of claim 1, wherein detecting the first signal indicating the existence of a voice call further comprises detecting a third signal indicating that a received voice call has been answered using the vehicle equipment.

11. The method of claim 1, further comprising:
    detecting a plurality of portable devices playing media assets, wherein the audio component of each of the plurality of portable devices is output to respective first audio devices of each of the plurality of portable devices;
    determining whether the audio components of at least two of the plurality of portable devices being output through respective first audio devices interfere with the audio output of the voice call; and simultaneously repressing the audio component outputs of the at least two portable devices through the respective first audio devices upon determining that the audio component outputs of the at least two portable devices interfere with the audio output of the voice call.

12. The method of claim 1, further comprising:

receiving the first signal over a wireless network from the vehicle equipment; and in response to receiving the first signal over the wireless network:

determining whether a portable device inside of the vehicle is playing a media asset that includes an audio component being output through a first audio device; and determining whether the output of the audio component of the media asset through the first audio device will interfere with audio output of the voice call through the vehicle equipment.

13. A system for playing media assets in a vehicle, the system comprising:

a portable device, a first audio device, a database stored in a storage unit, and vehicle equipment with control circuitry configured to:

detect a first signal indicating the existence of a voice call in the vehicle equipment;

determine whether the portable device inside of the vehicle is playing a media asset that includes an audio component being output through the first audio device;

compare audio level of the output of the audio component of the media asset with an audio level threshold stored in the database to determine whether the output of the audio component of the media asset through the first audio device will interfere with audio output of the voice call through the vehicle equipment;

repress output of the audio component through the first audio device upon determining that the output of the audio component through the first audio device will interfere with the audio output of the voice call; and maintain uninterrupted output of the audio component through the first audio device upon determining that the output of the audio component through the first audio device will not interfere with the audio output of the voice call.

14. The system of claim 13, wherein the first audio device is a speaker.

15. The system of claim 13, wherein the control circuitry is further configured to pause playback of the media asset on the portable device.

16. The system of claim 15, wherein the control circuitry is further configured to:

determine that the output of the audio component through the first audio device no longer interferes with the audio output of the voice call; and resume playback of the paused media asset.

17. The system of claim 13, wherein the control circuitry is further configured to mute the audio component output through the first audio device.

18. The system of claim 13, wherein the control circuitry is further configured to:

measure the audio level of the output of the audio component of the media asset;

identify the audio level threshold stored in the database; and determine whether the audio level of the output of the audio component of the media asset exceeds the audio level threshold.

19. The system of claim 13, wherein the control circuitry is further configured to:

determine whether the output of the audio component of the media asset through a second audio device associated with the portable device will interfere with the audio output of the voice call;

detect that the second audio device has been activated; and play back the audio component output of the media asset through the second audio device instead of the first audio device upon determining that the output of the audio component of the media asset through the second audio device will not interfere with the audio output of the voice call.

20. The system of claim 19, wherein the control circuitry is further configured to detect that at least one of a headphone, an earphone, a microphone, and an in-ear monitor has been connected to the portable device or detecting that an option to output the audio component of the media asset through the second audio device has been selected.

21. The system of claim 13, wherein the control circuitry is further configured to detect a second signal indicating that the voice call has been initiated using the vehicle equipment.

22. The system of claim 13, wherein the control circuitry is further configured to detect a third signal indicating that a received voice call has been answered using the vehicle equipment.

23. The system of claim 13, wherein the control circuitry is further configured to:

detect a plurality of portable devices playing media assets, wherein the audio component of each of the plurality of portable devices is output to respective first audio devices of each of the plurality of portable devices;

determine whether the audio components of at least two of the plurality of portable devices being output through respective first audio devices interfere with the audio output of the voice call; and simultaneously repress the audio component outputs of the at least two portable devices through the respective first audio devices upon determining that the audio component outputs of the at least two portable devices interfere with the audio output of the voice call.

24. The system of claim 13, wherein the control circuitry is further configured to:

receive the first signal over a wireless network from the vehicle equipment;

determine whether a portable device inside of the vehicle is playing a media asset that includes an audio component being output through a first audio device in response to receiving the first signal over the wireless network; and determine whether the output of the audio component of the media asset through the first audio device will interfere with audio output of the voice call through the vehicle equipment in response to receiving the first signal over the wireless network.

* * * * *